United States Patent [19]

Nielsen

[11] 4,187,637
[45] Feb. 12, 1980

[54] TOY VEHICLE

[75] Inventor: Edwin A. Nielsen, Oceanside, N.Y.

[73] Assignee: Ideal Toy Corporation, Hollis, N.Y.

[21] Appl. No.: 841,226

[22] Filed: Oct. 11, 1977

Related U.S. Application Data

[62] Division of Ser. No. 783,849, Apr. 1, 1977, Pat. No. 4,109,913, which is a division of Ser. No. 747,441, Dec. 6, 1976, abandoned.

[51] Int. Cl.² .............................................. A63H 17/36
[52] U.S. Cl. ........................................................ 46/262
[58] Field of Search ................. 46/211, 147, 213, 262, 46/202, 221, 201, 206, 251, 252, 257, 260; 104/60, 53, 242; 273/86 R, 86 B; 180/131; 280/113, 776; 40/613

[56] References Cited

U.S. PATENT DOCUMENTS

| | | | |
|---|---|---|---|
| 1,855,702 | 4/1932 | Berger | 46/211 |
| 3,115,724 | 12/1963 | Clarke | 46/251 |
| 3,453,970 | 7/1969 | Hansen | 273/86 B |
| 3,474,564 | 10/1969 | Perryman | 46/201 |
| 3,813,812 | 6/1974 | Barlow et al. | 273/86 B |
| 4,055,021 | 10/1977 | Okamoto | 46/202 |

FOREIGN PATENT DOCUMENTS

| | | | |
|---|---|---|---|
| 148252 | 12/1950 | Australia | 46/201 |
| 273957 | 5/1914 | Fed. Rep. of Germany | 46/211 |
| 847872 | 8/1952 | Fed. Rep. of Germany | 46/211 |
| 458350 | 7/1950 | Italy | 46/202 |
| 470465 | 8/1937 | United Kingdom | 46/206 |

*Primary Examiner*—F. Barry Shay
*Attorney, Agent, or Firm*—Richard M. Rabkin

[57] ABSTRACT

A toy vehicle is provided for use in a toy vehicle game including an endless track defining at least two parallelly extending vehicle lanes in which two or more toy vehicles are adapted to be operated. The toy vehicle includes a reversible rotary drive motor and a transmission operatively engaged between the motor and two drive wheels for rotating one or the other of the drive wheels in response to the direction of rotation of the drive motor, thereby biasing the car against one or the other of the side walls of the track to guide the vehicle along its path of travel in one or the other of the lanes. The vehicle is used on a track which includes electrical contact strips which supply power to the drive motor of the vehicles through current collectors mounted thereon. A control system permits the operators to separately and independently control current to the contact strips and also to selectively reverse the polarity of the current so that the operators can vary the speed of their associated vehicles and cause the vehicles to move from one lane to the other.

13 Claims, 11 Drawing Figures

TOY VEHICLE

This is a division, of application Ser. No. 783,849 filed Apr. 1, 1977, now U.S. Pat. No. 4,109,913, which is a division of U.S. Patent Application Serial No. 747,441 filed December 6, 1976, now abandoned the disclosure of which is incorporated herein by reference as if set forth herein in its entirety. The present invention relates to toy vehicles for use in a toy vehicle game. More particularly the invention relates to toy vehicles which are separately controlled by the players to enable them to turn out from one lane to the other and pass other vehicles on the track.

With the ever increasing popularity of toy vehicle games, such as for example the well known "slot car" games, there is an increasing demand for more realistic action. To this end attempts have been made in the past to provide "slot car" type games with speed control systems, as for example by varying current flow to the vehicles in the game. To further enhance such realism the slot arrangements in such games also provide for crossing the vehicles from one side of the track to another, to simulate an actual changing of lanes. However, the vehicle is in fact constrained to a fixed predetermined an unvariable path.

Since the play value of such previously proposed vehicle games is limited to the regulation of speed of travel, attempts have been made to provide toy vehicle games which enable an operator to control movement of the vehicle from one lane to the other without the constraint of a guide slot in the track. Such systems include for example the type shown in U.S. Pat. No. 3,797,404, wherein solenoid actuated bumpers are used to physically push the vehicle from one lane to the other by selectively engaging the bumpers along the side walls of the track. It is believed that this type of system will not insure movement of the vehicle from one lane to the other, particularly at slow speeds, and the bumper movements for pushing the vehicle are not realistic.

Other attempts to provide for vehicle control for moving the vehicle from one lane to the other involve relatively complicated steering control mechanisms which respond to the switching on and off of current to the toy vehicle as supplied through contact strips in the track surface. Such systems are disclosed for example in U.S. Pat. Nos. 3,774,340 and 3,837,286. However, in addition to the relative complexity of the steering arrangements, the vehicles will of course lose speed when the current supply is shut off, so that the vehicle will slow down and the realistic effect desired to be produced is affected.

Still other steering systems have been provided in toy vehicles wherein the vehicle's steering is controlled in response to a reversal of the polarity of the current flow to the electrical drive motor in the vehicle. Such systems are disclosed for example in U.S. Pat. Nos. 3,453,970 and 3,813,812, which avoid the problem of stopping current flow completely to the motor so that there is little or no loss of speed, but their steering systems contain numerous moving parts which will wear and require constant attention. In U.S. Pat. No. 3,453,970 to Hansen, the electrical wires connecting the motor to the current collectors of the vehicle are used to aid the steering operation and thus may well work loose during use of the vehicle. Another reversing polarity system is shown in U.S. Pat. No. 3,232,005 wherein the toy vehicle does not operate on a track and the steering control is not provided for switching lanes, but rather to provide an apparently, random travel control for the vehicle.

Still another toy vehicle game which has been suggested to avoid the constraints of slot car type systems, is disclosed in U.S. Pat. No. 3,239,953 wherein a relatively complex steering control is provided which is responsive to the actuation of a solenoid mounted in the toy vehicle and is controlled remotely by the players.

It is an object of the present invention to overcome the limitations of previously proposed toy vehicle games wherein toy vehicles are permitted to turn out and move from one lane to the other without the restraint of a guide slot or the like.

Still another object of the present invention is to provide a toy vehicle which is adapted to move along a guide track and change from one lane to the other, under the control of a player.

A still further object of the present invention is to provide a toy vehicle for use in a game in which separate vehicles can be separately controlled by the players to move from one lane to the other and pass one another.

A still further object of the present invention is to provide a toy vehicle having a relatively simple drive transmission responsive to the polarity of current flow to an electrical motor in the vehicle, to drive the vehicle is one or the other of the lanes of the track.

A still further object of the present invention is to provide a toy vehicle having a relatively simple drive transmission system which enables one or the other of its two rear wheels to be driven in response to the polarity of current supplied to the electrical motor in the vehicle.

Another object of the present invention is to provide a toy vehicle of the character described which is relatively simple in construction and durable in operation.

Yet another object of the present invention is to provide a toy vehicle which is relatively simple and economical to manufacture.

In accordance with an aspect of the present invention, a toy vehicle is provided which includes a frame, a body mounted on the frame, and a plurality of ground engaging wheels, including a pair of drive wheels. The drive wheels are mounted in the frame for independent rotation in laterally spaced vertical planes and a reversible electric motor is also provided for selectively driving the wheels. A drive transmission is mounted in the frame to connect the output of the electrical motor to the drive wheels. This drive transmission includes at least one transmission element which is movably mounted in the frame for movement between first and second positions in response to the direction of rotation of the drive motor thereby to drive one or the other of the drive wheels. Preferably, two of the toy vehicles are used on an endless track having laterally spaced side walls defining two vehicle lanes therebetween. When the vehicles are operated with only one or the other of their drive wheels driven from their respective motors, the vehicles will move into engagement with and be guided along one of these side walls.

The power supply to the electrical motors of the vehicles is provided through electrical contact strips located in the lanes of the vehicle track. This power supply system is constructed to enable the operators to separately control the speed of the vehicles and also to separately reverse the polarity of current flow to the electrical motors of the vehicles, whereby the vehicles will change lanes. In addition the vehicles are provided with a relatively simple shock absorbing front end system which absorbs the impact of the vehicle against the side walls during a lane change and directs the front wheels of the vehicle in the desired path of travel. The above, and other objects, features and advantages of this invention will be apparent in the following detailed description of illustrative embodiments thereof, which are to be read in connection with the accompanying drawings, wherein:

Figure 4:
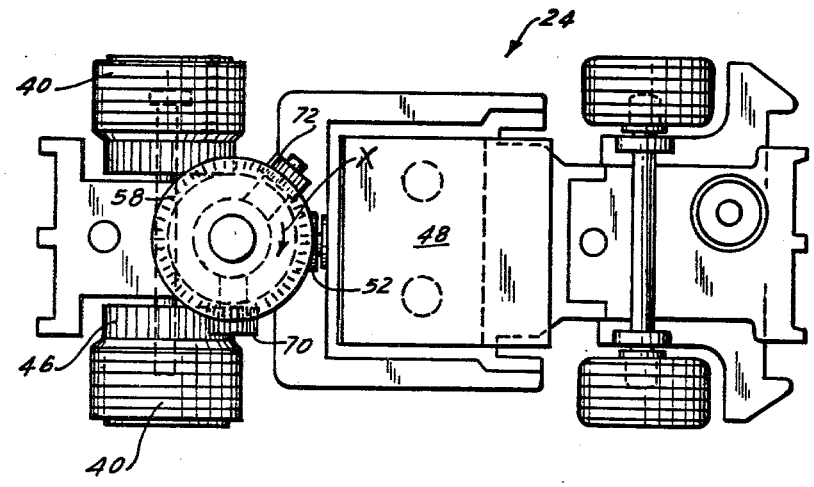
FIG. 4 is a top plane view of the toy vehicle shown in FIG. 2, but with the body removed.
Figure 9:
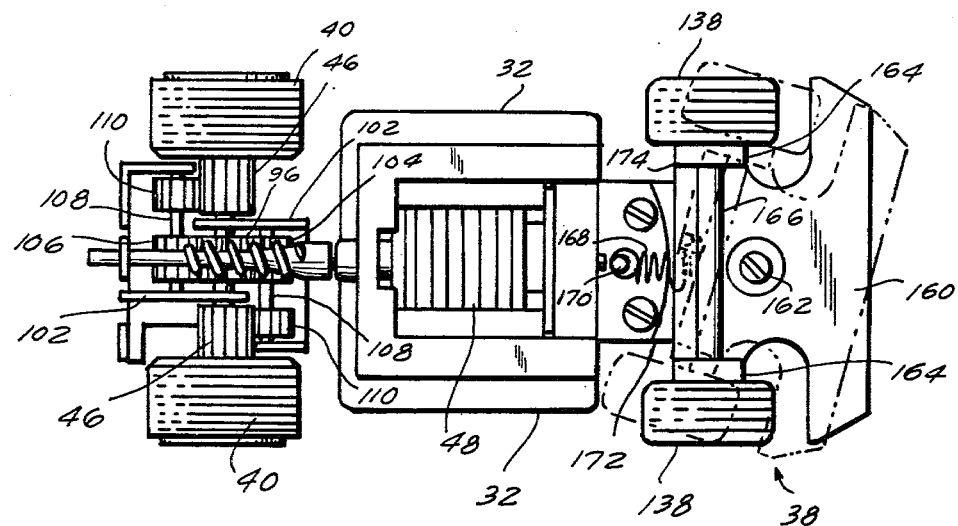
Figure 10:
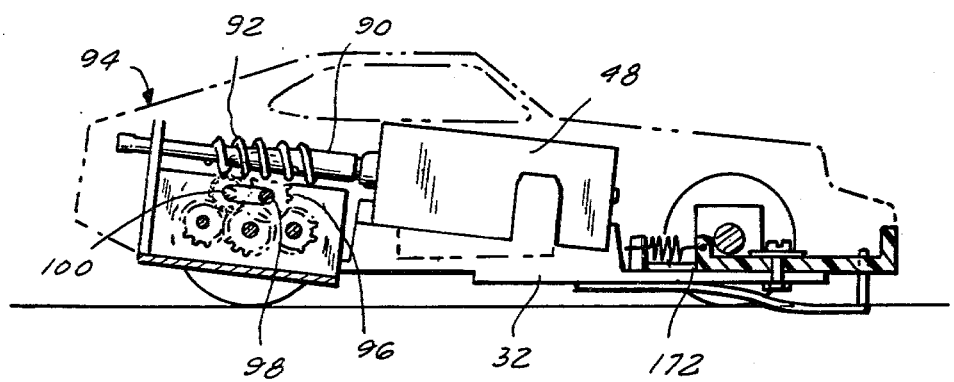

FIG. 9 is a plan view, similar to FIG. 4, of a toy vehicle according to one embodiment of the present invention; and FIG. 10 is a longitudinal side view of the toy vehicle illustrated in FIG. 9; Referring now to the drawings in detail, and initially to FIG. 1 thereof, a toy vehicle game 10 in which the toy vehicles of the present invention are to be used, includes an endless plastic track 12 having a pair of laterally spaced upstanding side walls 14, 16 and a road bed or tread surface 18 extending therebetween. The road bed 18 has a width sufficient to define at least two vehicles lanes 20, 22 thereon along which a plurality of vehicles can be operated.

In the illustrative embodiment the toy vehicle game includes operator controlled vehicles 24, 26 which are of substantial identical construction except for the arrangement of their current collectors as described hereinafter. In addition, a drone car 28, which moves along the track at a relatively constant speed is also provided.

Vehicles 24, 26 are separately controlled by the players through a control system 30 which enables the players to vary current supply to the electrical motors in the vehicles, thereby to vary the vehicle speed. The controllers also enable the players to change the polarity of current supplied to the respective vehicle motors, whereby the vehicles can be switched by the players from one lane to the other. The drone car 28 on the other hand moves along the vehicle track at a constant speed providing an obstacle along the track which the player controlled cars 24, 26 must pass. The front wheels of the drone car are preferably canted in one direction or the other so that the drone will normally be driven in either the inner or the outer lane depending on the position of the wheels. This vehicle includes an electric motor operated by a battery contained within the vehicle, and connected through a direct drive transmission of any convenient construction to the rear wheels thereof. Preferably, drone vehicle 28 is of the type illustrated and described in detail in co-pending U.S. Pat. Application Ser. No. 747,442 filed Dec. 6, 1976, and commonly assigned herewith. The disclosure of said U.S. Pat. Application Ser. No. 747,442 is incorporated herein by reference.

Figure 2:
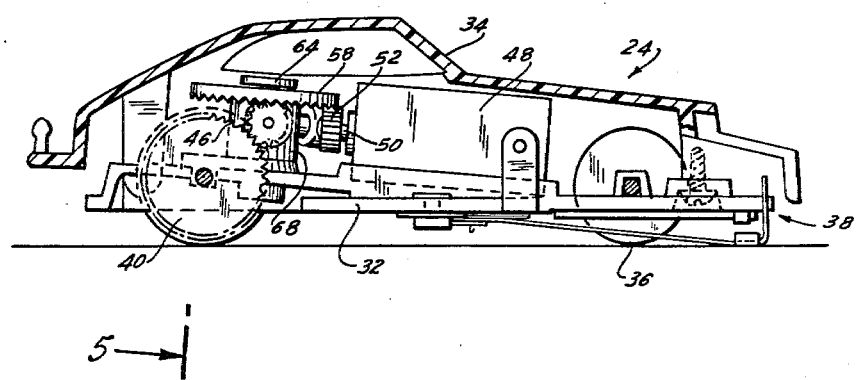
FIG. 2 is a longitudinal sectional view of a toy vehicle adapted for use with the game of FIG. 1.
Figure 3:
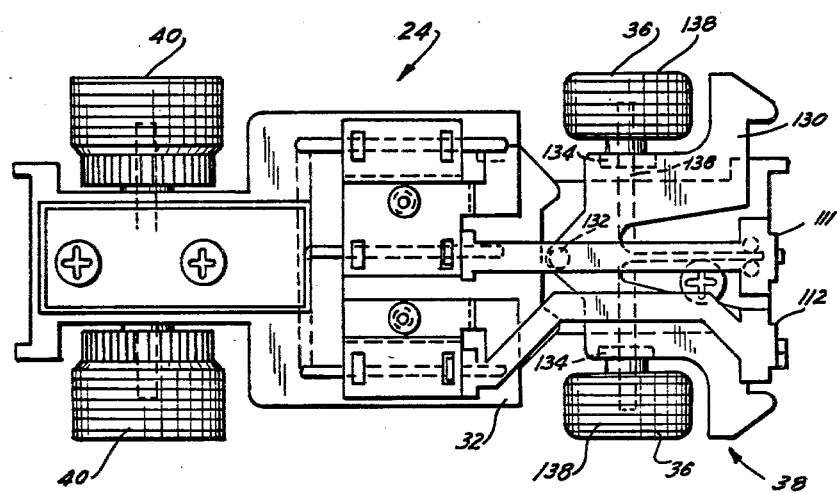
FIG. 3 is a bottom view of one of the toy vehicles illustrated in FIG. 1.
Figure 5:
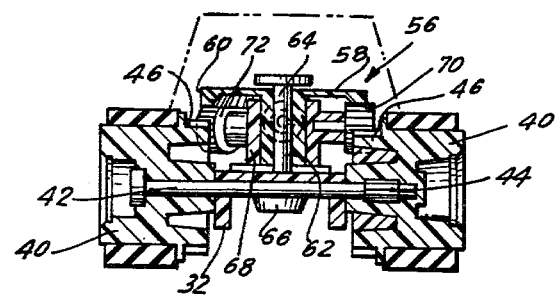
FIG. 5 is a sectional view taken along line 5—5 of FIG. 2.

Toy vehicle 24 is illustrated in detail in FIGS. 2-4. As seen therein the vehicle includes a frame or chassis 32 of any convenient construction, and a removable plastic body or shell 34 which may be snap fit on frame 32 in any convenient manner. A pair of front wheels 36 are rotatably mounted on the frame, through a shock absorbing front end system 38, described more fully hereinfter, while the rear wheels 40 are rotatably mounted for independent rotation on a shaft 42 rotatably mounted in frame 32. (See FIG. 5). One of the drive wheels 40 is fixed on shaft 42 by a spline 44 or the like, while the other of the wheels is freely rotatably mounted on the shaft. Alternatively both wheels can be freely rotatably mounted on the shaft or axle 48. With either arrangement the wheels can be separately and independently driven.

Each of the drive wheels 40 is formed from either a molded plastic material or from a cast metal material, and has on its inner side an integral spur gear 46 formed thereon by which rotary is supplied to the respective wheels.

The power for driving the toy vehicle is supplied from a D.C. electric motor 48 mounted on frame 32 in any convenient manner. The electric motor is of conventional D.C. construction and includes a rotary output member or shaft 50 connected and includes a rotary output member or shaft 50 connected to the rotor of the motor in the usual manner. In the embodiment illustrated in FIG. 2 a spur gear or output drive element 52 is secured to shaft 50 for rotation thereby. This output member is drivingly engaged with the transmission system 56 which is responsive to the direction of rotation or the output drive element (i.e. the direction of rotation of output shaft 50 of motor 48, due to the polarity of current supplied to the motor) to selectively drive the drive wheels 40.

Figure 6:
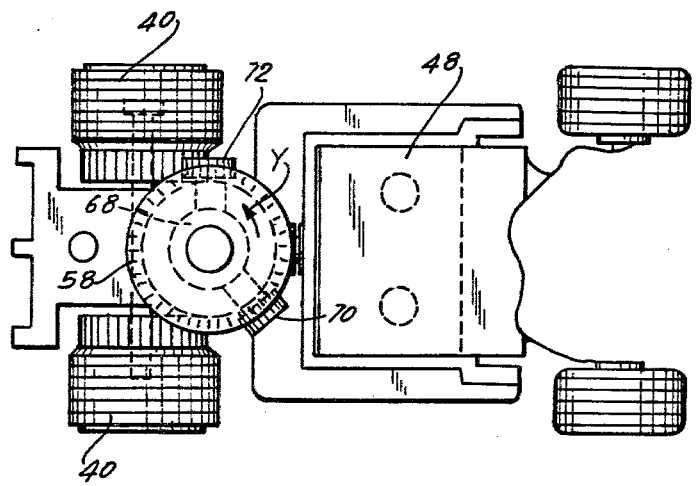
FIG. 6 is a top plan view, similar to FIG. 4, but showing another position of the drive transmissions of the vehicle.

In the embodiment illustrated in FIGS. 2 and 4–6, transmission system 56 includes a crown gear 58 having downwardly extending teeth 60 and a central collar 62. A mounting pin 64 extends through collar 62 and is secured at its lower end 66 in frame 32 so that crown gear 58 is freely rotatably mounted thereon. A movable transmission element including a sleeve or gear support member 68 is rotatably mounted on collar 62. A pair of spur gears 70, 72 are in turn rotatably mounted on sleeve 68 for rotation along axes extending generally perpendicularly to the axis of rotation of crown gear 58. These gears 70, 72 are positioned at an angle to each other (see FIG. 4) in engagement with crown gear 58. As a result of this arrangement when the motor 48 is operated crown gear 58, due to its engagement with the spur gear 52, will be rotated in either a clockwise or counterclockwise direction, as seen in FIGS. 4 and 6, depending upon the polarity of the current supplied to motor 48. At the same time gears 70, 72 will be continuously rotated by the crown gear. However, because gears 70, 72 are mounted on the rotatable sleeve 68, the engagement between the gears 58, 70, 72 will cause sleeve 68, and thus gears 70, 72 to rotate axially about pin 64 and collar 62, in a clockwise or counterclockwise direction according to the direction of rotation of the crown gear. As a result, as seen in FIG. 4, when crown gear 58 is rotated in a clockwise direction indicated by the arrow X gears 70, 72 will also be moved in a clockwise direction so that gear 70 engages the gear 46 of the lower wheel 40 in the vehicle shown in FIG. 4. Thus the right drive wheel of the vehicle will be driven, while the left drive wheel will be free to rotate.

Figure 1:
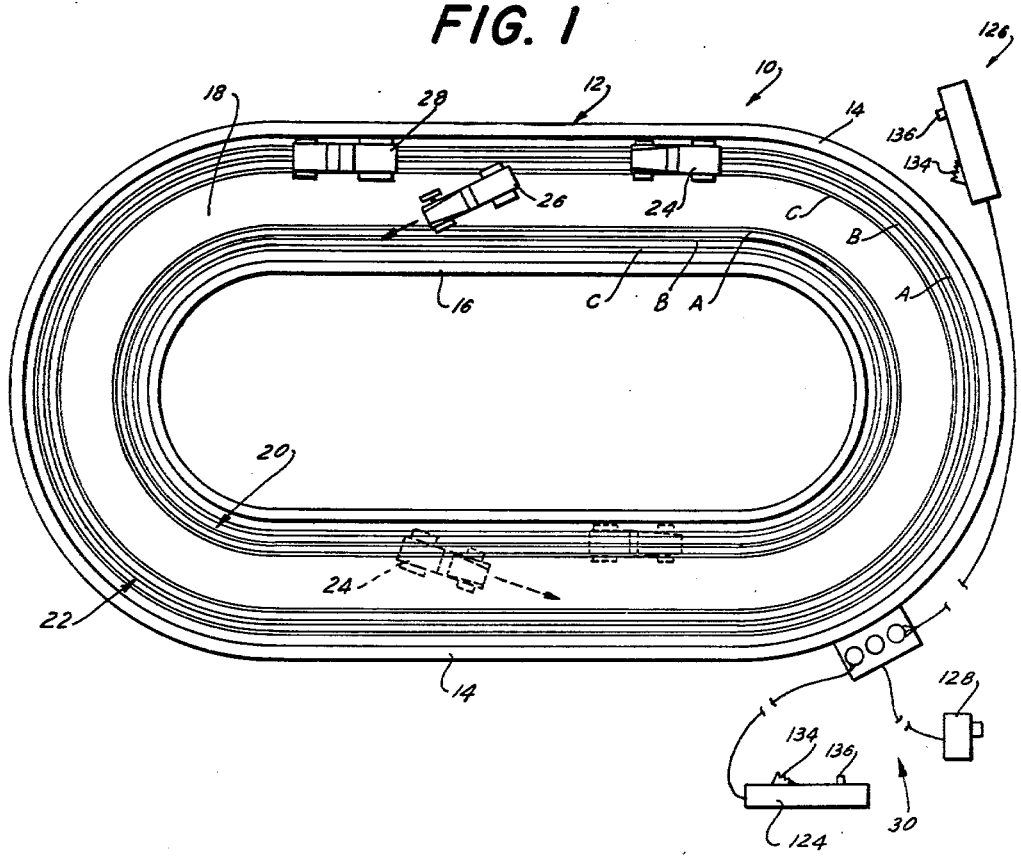
FIG. 1 is a plan view of a toy vehicle game in which the toy vehicles of the present invention are used.

In the game illustrated in FIG. 1 when vehicle 24 is in the outside lane and power is supplied to its right wheel 40 in this manner, as a result of the polarity of current supplied to the motor 48, the toy vehicle will be caused to move from the outer lane to the inner lane, as is shown in FIG. 1 occurring with the vehicle 26. When this occurs the front end of the vehicle will engage the inner wall 16 of the track and the continued drive of its right wheel will cause the vehicle to move along wall 16 in the inner land 20 of the track. Of course, if the vehicle is moving at a relatively high rate of speed as it goes about a curve in the track it may be propelled by centrifugal force into the outer land. However, if the drive to the right hand wheel is maintained it will move inwardly again to the inner lane as previously described.

On the other hand, when the polarity of current supplied to the motor 48 is reversed crown gear 58 will rotate in a counterclockwise direction, as illustrated by the arrow Y in FIG. 6. When this occurs gears 70, 72 will be driven in an opposite direction and sleeve 68 will be caused to rotate in the same direction as gear 58. This will engage gear 72 with gear 46 of the left drive wheel 40 (i.e the upper wheel 40 in FIG. 6) so that this wheel is driven while the right wheel is free to rotate.

When the left wheel of the vehicle is driven in this manner, a bias is applied to the vehicle which will cause it to move to the right. Thus, as illustrated in FIG. 1 by the vehicle 24 shown in dotted lines, when the vehicle is in the inner lane 20 of track 12 and the polarity of the current flow to the motor 48 is changed so that its left wheel 40 is driven, the vehicle will be biased towards its right into outer lane 22. When the front end of the vehicle hits outer wall 14 it will continue to move along that outer wall in outer lane 22 until the polarity of current supplied to the motor 48 is again reversed. In this regard it is noted that because of the arrangement of gears 52, 58, 70 and 72 the vehicle will always be propelled in a forward direction regardless of the direction of rotation of the output element 52 of the motor.

A toy vehicle according to the present invention is illustrated in FIGS. 9 and 10, and includes another form of transmission system which also will selectively drive the right or left hand drive wheels of the toy vehicle according to the polarity of current supplied to the electric motor. In this embodiment of the invention the toy vehicle also includes a frame 32 and a drive motor 48. The drive motor includes an output shaft 90 having a worm gear 92 mounted thereon which is connected through a transmission 94 to selectively drive either of the left or right wheels 40. Transmission 90 also includes a movable transmission element, but in this case the movable transmission element is a single spur gear 96. This gear has a shaft 98 secured thereto and extending from opposite sides of the gear into slots 100 formed in upstanding flanges 102 on frame 32. By this arrangement, depending upon the polarity of current supplied to motor 48, spur gear 96 will move to a forward position in FIG. 10 or a rearward position at the opposite end of slot 100, illustrated in dotted lines in FIG. 10. Additional gears 104, 106 are rotatably mounted in flanges 102 at these extreme opposite positions of gear 96 to be selectively engaged with the gear 96 depending upon the direction of rotation of the output element 92 or shaft 90 of the motor 48. These gears 104, 106 are rigidly connected through shafts 108 to gears 110 which engage gears 46 of wheels 40. By this arrangement drive wheels 40 will always be driven in a forward direction regardless of the position of the gear 96 and the direction of rotation of motor 48. And, by controlling the polarity of the motor, the operators can control which of the rear drive wheels of the vehicle will be supplied with power, so that the vehicle can be used in the game of FIG. 1, in the same manner as the vehicles previously described, to enable the operators to cause the vehicles to change position from one lane to the other.

In order to supply current to the toy vehicles the track surface 18 is provided with a plurality of electrical contact strips in each of the lanes 20, 22. In the illustrative embodiment each lane is provided with three contact strips A, B and C respectively. The strips are formed of an electrically conductive metallic material and are embedded in the track so that they are substantially flush with the surface of the track and present no obstacle to movement of the vehicles from one lane to the other. Current is supplied to these strips, as described hereinafter, and is collected by current collectors mounted on the frame 32 of the toy vehicles in predetermined locations.

The contact strips in each lane are paired with each other, i.e., the A strip in one lane is electrically connected to the A strip in the other lane, the B strips are connected to each other and the C strips are connected to each other. The C strips are connected to electrical ground and the A and B strips are provided to separately supply current and control polarity of the current to the respective vehicles, so that two vehicles can operate in the same lane and still be separately controlled. For this reason the current collector and the vehicles are arranged to associate the respective vehicles with only one of the pairs of contact strips. For example, vehicle 24 will obtain current from strips B, while vehicle 26 will obtain current only from strips A.

As illustrated in FIG. 3 vehicle 24 is provided with two current collectors 111, 112 with the current collector 112 thereof positioned to contact ground strip C. Similarly vehicle 26, illustrated in FIG. 3A, has current collectors 112, 114 mounted thereon with current collector 112 located in the same position as the corresponding collector of vehicle 24 for also contacting the ground strip C. These current collectors are mounted on the vehicle in any convenient manner known in the art, and are electrically connected in a known manner to motor 48 of their respective vehicles. Current collector 111 of vehicle 24 is mounted on the vehicle to engage contact strips B regardless of which lane the vehicle is in. As seen in FIG. 3 this current collector is located centrally of the vehicle frame. On the other hand, the current collector 114 of vehicle 26 is located off center from the center line of the vehicle body and in spaced relation to its associated current collector 112. This current collector is positioned to engage contact strips A regardless of the lane in which the vehicle is moving. By this arrangement, each of the operators can separately control current supply and polarity to contact strips A, B to control a respective one of the vehicles 24, 26 regardless of the lane occupied by the vehicle.

Figure 7:
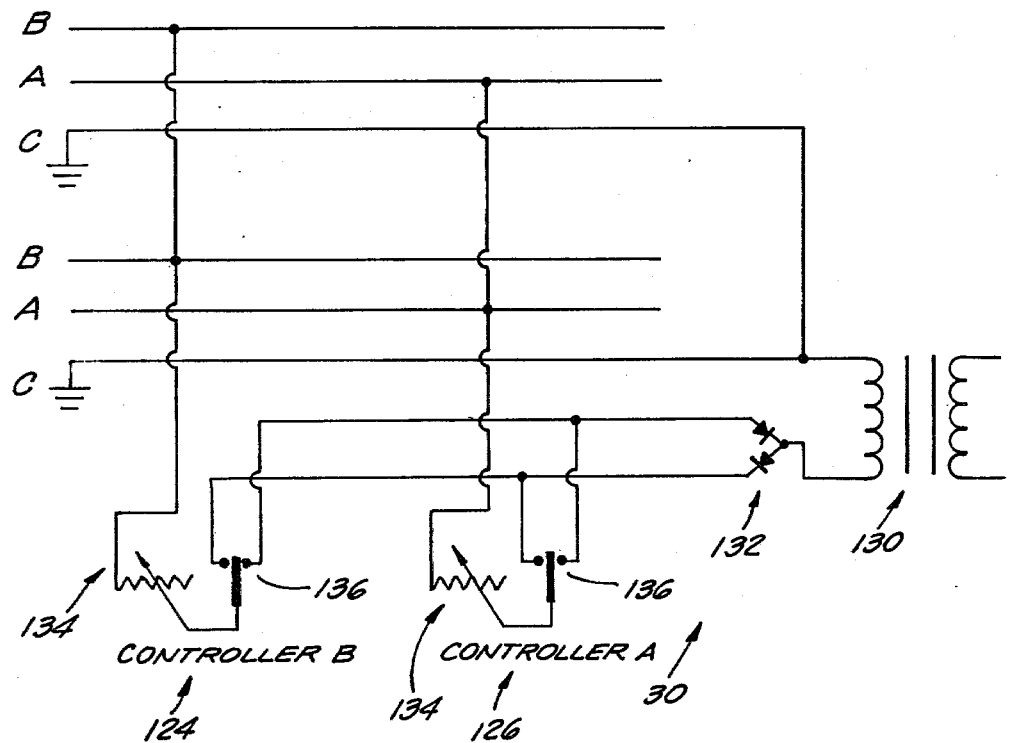
FIG. 7 is a shematic electrical circuit diagram of the electrical control system used for the toy vehicle game of FIG. 1.

The control system 30 for the toy vehicle game illustrated in FIG. 1, is shown schematically in FIG. 7. This control system inclludes respective controllers 124, 126 by which the players can control the vehicles 24, 26 respectively. Essentially the control system includes a plug 128 by which the system can be connected to an electrical AC power source, and it includes a transformer 130. Power is supplied from the transformer 130 through a halfwave rectifier 132 including two diodes connected as shown to separately supply current to the controllers 124, 126. Each controller is provided as a hand held unit and includes a variable resistor 134, operated as a trigger on the unit, as well as a single pole double throw switch 136. Current from controller 124 is supplied through its variable resistor 134 to the contact strips B and current from the controller 126 is supplied through its variable resistor to the contact strips A. The variable resistors may be of any convenient construction to permit the operators to vary the current supplied to their respective contact strips, and thus their respective vehicles, in order to vary the speed of the vehicles.

The polarity of the current supplied to the toy vehicles is separately and independently controlled by switches 136 so that the polarity of current supplied to motor 48 of the respective vehicles, as controlled by the respective controllers, will vary in accordance with the position in which the switches 136 are placed. By this arrangement each player, using his controller 126 or 124, can control the speed of his vehicle along the track 12 and he can also variably position his vehicle along the track simply by changing the polarity of current supplied to the vehicle. As described above the polarity of the current supplied to the motor of the respective toy vehicles will determine which of the two rear drive wheels is powered, and this will determine which lane the vehicle will be driven to.

A illustrated in FIG. 1, when it is desired to switch a vehicle from the outer lane to the inner lane, as shown with vehicle 26, the polarity of current supplied to the vehicle is selected to drive the outer or right wheel of the vehicle thereby moving the vehicle leftwardly into the inner lane. Likewise, when it is desired to move the vehicle outwardly the inner or left wheel of the vehicle is driven, by properly selecting the polarity of current supplied to the motor of the vehicle, so that the vehicle will move toward the right and into the outer lane. Thus the operators have complete control over both the speed of the vehicle and the lane in which the vehicle will move.

In the illustrative embodiment when a drone car 28 having a constant speed of movement is utilized, an obstacle is provided in the outer lane of the track which the players must pass in order to continue moving along the track. This enhances the play value of the game as all players will have to pass the drone car during the game at some stage of operation of the game, and this introduces a further variable factor into the game requiring an additional degree of skill and vehicle control in order to win the "race".

Figure 8:
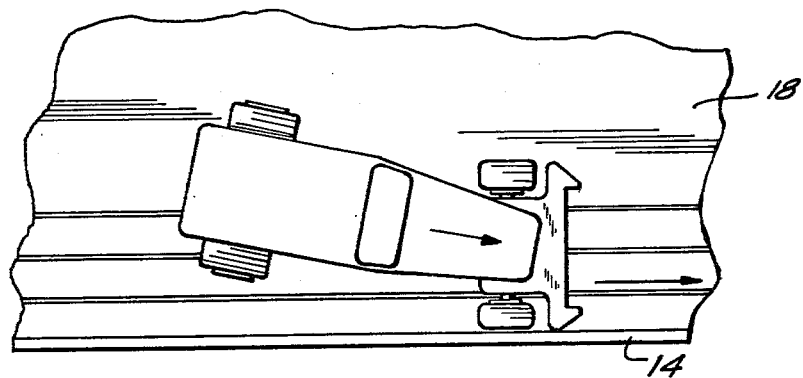
FIG. 8 is an enlarged view illustrating the impact of a vehicle against one of the side walls of the track during a lane change.

As mentioned, the toy vehicles of the present invention include shock absorbing front ends 38. In the embodiment of the invention illustrated in FIG. 3 the front end 38 includes a wheel support plate 130 pivotally mounted by a pivot pin 132 or the like on frame 32 of the vehicle. The plate includes bosses 134 of any convenient form which rotatably mount a shaft 136 on which the front wheels 138 of the toy vehicle are secured. Plate 130 is held in its centered position, so that the front wheels of the vehicle will normally direct the vehicle in a straight line, by a spring arrangement 140 which includes an integral tongue 142 formed with the plastic plate 130. This tongue is captured between a pair of posts or abutment members 144 formed in frame 32. By this arrangement plate 130, and thus wheels 138, are resiliently held in their centered position. However, when the vehicle changes lanes and impacts against one of the side walls (for example the outer walls 14, shown in FIG. 8) the plate 130 will pivot in response to that impact and the shock of that impact will be absorbed by the spring element or tongue 142. At the same time the pivotal movement of the plate will turn wheels 138 therewith and direct them along the desired path of travel, thereby insuring that the vehicle will move into alignment with the contact strips of the track, as quickly and rapidly as possible. To assist in the shock absorbing feature of the invention plate 130 is provided with enlarged bumper elements 146 which extend outwardly beyond the frame of the vehicle so that the bumper elements engage the side wall of the track before the vehicle or any portion thereof.

Figure 3A:
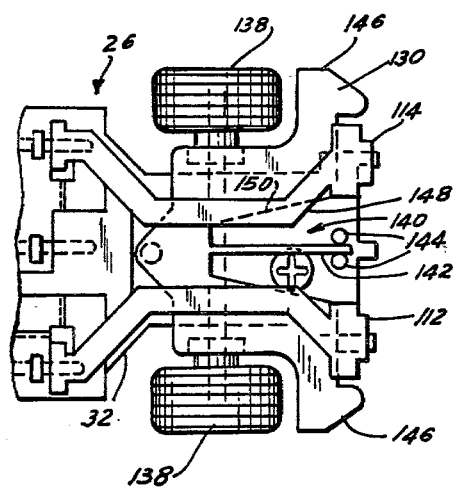
FIG. 3A is a bottom view of the front end portion of a second vehicle used in the game of FIG. 1.

As seen in FIG. 3A tongue 142 is defined between slots 148 formed in plate 130 on opposite sides of the tongue. These slots have outer edges 150 which will engage against posts 144 in the event plate 130 is pivoted a sufficient distance. The engagement of the side edges 150 of the slots against the posts 144 will limit the pivotal movement of the plate beyond a predetermined maximum position.

Another embodiment of the front end shock absorbing system of the present invention is illustrated in FIGS. 9 and 10. In this form of the invention the shock absorbing front end includes a plate or wheel support element 160 pivotally mounted by a pivot pin 162 or the like on frame 32 of the vehicle. Plate 160 includes upstanding bosses 164 which rotatably mount a shaft 166 on which the front wheels 138 of the toy vehicle are secured. The plate is held in its normally centered position by a coil spring 168 connected at its opposite ends to plate 160 and to a post 170 on frame 32. The coil spring is located along the axial center line of the plate and vehicle to hold the plate in its normally centered position. When the toy vehicle having a front end of this construction impacts against the side wall of the track plate 160 will pivot in the same manner as previously described with respect to plate 130 to align the wheels with the side walls of the track and insure rapid return of the vehicle into alignment with the contact strips of the lane to which it has moved. Preferably in this embodiment of the invention frame 32 is provided with a lip or stop surface 172 of arcuate configuration as shown in FIG. 9, which acts as a stop surface cooperating with rear edge 174 of plate 160 to limit the amount of pivotal movement permitted to plate 160.

Accordingly it is seen that a relatively simply constructed toy vehicle is provided for use in a game in which players have complete independent control over the speed of operation of the toy vehicles, including the ability to cause the toy vehicles to shift independently from one lane to the other in order to pass each other or to pass a drone car moving along the track in a constant speed. This is achieved without the complexities of multiple element steering systems or solenoid bumper and steering arrangements. Moreover, it is accomplished with a simple change in polarity of the current flow to the toy vehicle's motor and eliminates the attendant loss of speed which occurs with previously proposed structures wherein lane changes are provided as a result of shutting off of power to the vehicle motor.

Although illustrative embodiments of the present invention have been described herein with reference to the accompanying drawings, it is to be understood that the invention is not limited to that precise embodiment, but that various changes and modifications may be effected therein by one skilled in the art without departing from the scope or spirit of this invention.

I claim:

1. A toy vehicle adapted for use on a track having side walls and including a frame, a pair of drive wheels, a drive motor in said frame, transmission means for selectively driving one or the other of said drive wheels to steer said vehicle to the right or left, and a shock absorbing wheel mount on said frame including a one piece wheel support element pivotally mounted on said frame, a pair of wheels both of which are rotatably mounted on said wheel support element; and spring means engaged between said support element and said frame for biasing said wheel support element into a normal, central position on said frame; said wheel support element including integral bumper surfaces extending beyond opposite sides of said frame; whereby when said bumper surfaces engage the side walls of the track said wheels move with said wheel support element pivoting therewith on the frame in the same direction as said wheel support element.

2. A toy vehicle as defined in claim 1 wherein said spring means comprises a coil spring.

3. A toy vehicle as defined in claim 2 including stop means for limiting pivotal movement of said support element.

4. A toy vehicle including a frame and a shock absorbing wheel mount on said frame including a wheel support element pivotally mounted on said frame, a pair of wheels rotatably mounted on said wheel support element and spring means operatively engaged between said wheel support element and said frame for biasing said wheel support element into a normal, central position on said frame; said spring means comprising an integral flexible tongue formed on said wheel support element, abutment means on said frame for holding a portion of said tongue against movement whereby said tongue holds the wheel support element in a normally central position but permits the support element to pivot upon an impact.

5. A toy vehicle as defined in claim 4 wherein said support element has a pair of elongated slots formed therein on opposite sides of said tongue and said abutment means comprises a pair of spaced posts formed on said frame between which said portion of the tongue is captured, said posts and slots cooperating to limit pivotal movement of said support element in opposite directions.

6. A toy vehicle for use on a track having a pair of spaced sidewalls along which the vehicle is guided and defining a pair of vehicle lanes, said vehicle comprising a frame, a plurality of wheels mounted on said frame including a pair of laterally spaced drive wheels, means for selectively driving one or the other of said drive wheels thereby to selectively steer said vehicle to the right or the left into guiding engagement with the sidewalls of the track on which it is adapted to be used, and a one piece support plate pivotally mounted on said frame; at least one of said wheels being rotatably mounted on said plate for simultaneous pivotal movement therewith in the same direction, and resilient means connected directly between said frame and plate for biasing said plate to a normal centered position wherein the at least one wheel mounted thereon is in a predetermined position with respect to the other vehicle wheels, said support element including integral bumper surfaces extending beyond opposite sides of said frame; whereby when said bumper surfaces engage the sidewalls of the track said at least one wheel moves with said plate pivoting therewith on the frame in the same direction.

7. A toy vehicle as defined in claim 6 wherein two wheels are rotatably mounted on said plate in laterally spaced relation to each other.

8. A toy vehicle comprising a frame, a plurality of wheels mounted on said frame, means for driving at least one of said wheels to propel said vehicle in a path of travel, and a wheel support plate pivotally mounted on said frame; two of said wheels being rotatably mounted on said plate in laterally spaced relation to each other for movement therewith, and resilient means operatively engaged between said frame and plate for biasing said plate to a normal centered position wherein the at least one wheel mounted thereon is in a predetermined position with respect to the other vehicle wheels whereby the vehicle will be driven in a predetermined direction; said resilient means comprising an integral flexible tongue formed on said plate and said frame including abutment means for holding a portion of said tongue against movement whereby said tongue holds the plate in said normally centered position but permits the plate to pivot on an impact.

9. A toy vehicle as defined in claim 8 wherein said tongue is located along the center line of said plate and the plate has a pair of elongated slots formed therein on opposite sides of said tongue, said slots having sidewalls spaced from said abutment means for cooperating with said abutment means to limit pivotal movement of said plate.

10. A toy vehicle as defined in claim 9 wherein said abutment means comprises a pair of spaced posts formed on said frame between which said portion of the tongue is captured.

11. A toy vehicle as defined in claim 10 wherein said support element includes bumper surfaces extending beyond said frame.

12. A toy vehicle as defined in claim 7 wherein said resilient means comprises a coil spring connected at opposite ends to said frame and plate and extending along the center line of the plate.

13. A toy vehicle as defined in claim 12 including stop means for limiting pivotal movement of said plate.

* * * * *